Sept. 9, 1969    J. S. SHOWALTER    3,465,466
FISHHOOK FOR ARTIFICIAL BAIT
Filed April 15, 1968
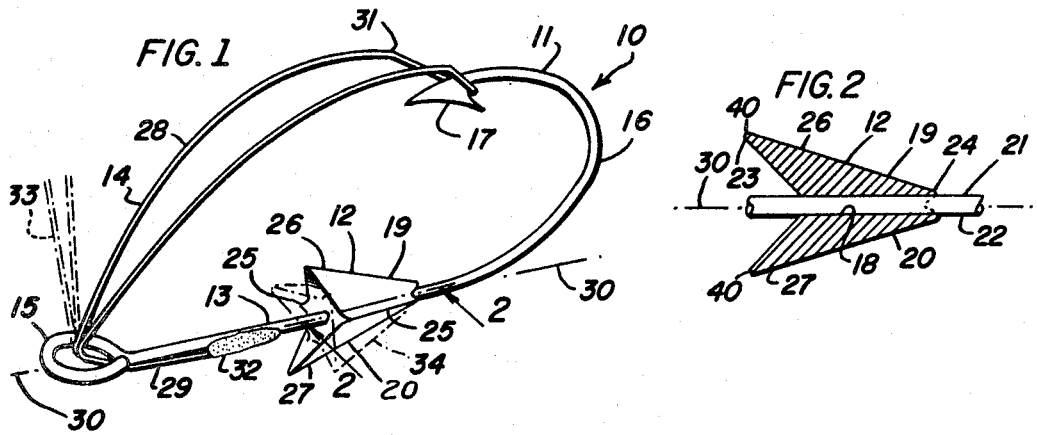
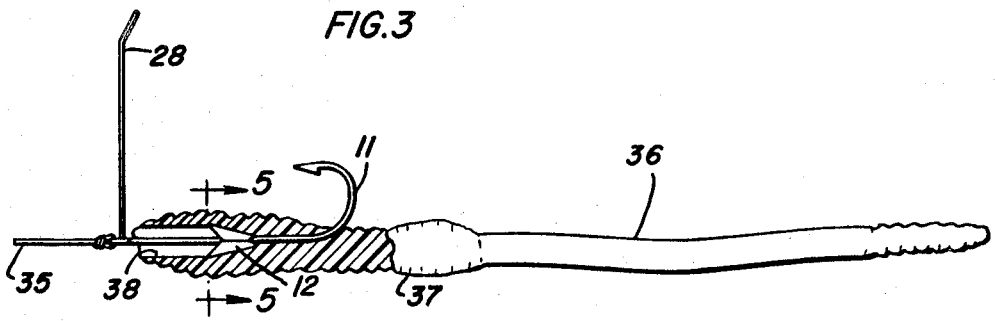
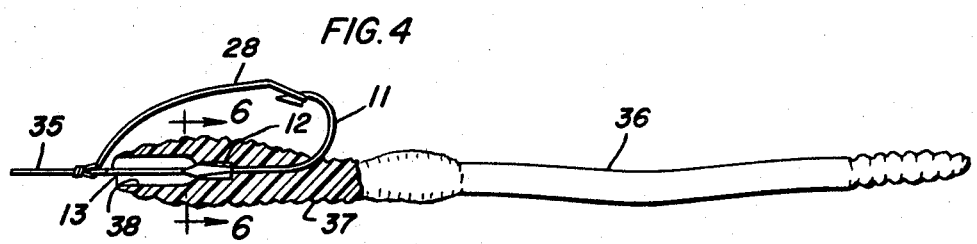
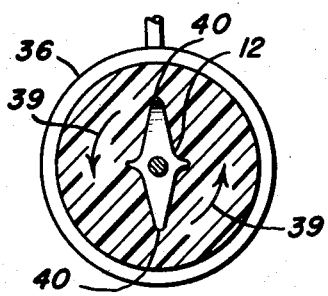
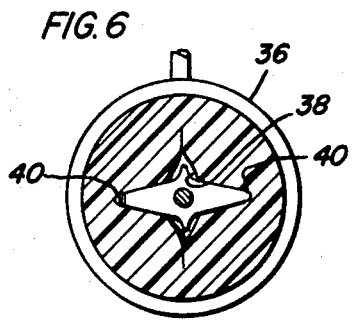
INVENTOR.
Joseph S. Showalter
BY
ATTORNEY

United States Patent Office 3,465,466
Patented Sept. 9, 1969

3,465,466
FISHHOOK FOR ARTIFICIAL BAIT
Joseph S. Showalter, Winter Park, Fla., assignor to Boone Bait Co., Inc., Winter Park, Fla., a corporation of Florida
Filed Apr. 15, 1968, Ser. No. 721,431
Int. Cl. A01k *83/06, 85/00*
U.S. Cl. 43—44.8                                    1 Claim

ABSTRACT OF THE DISCLOSURE

A fishhook that has a cast, arrowhead-shaped, metal element on the shank of the hook which provides opposed auxiliary barbs for better holding artificial bait made from soft resilient plastic material. The converging side edges of the cast element reduce unnecessary tearing as the plastic bait is impaled on the hook and the element can be rotatably adjusted on the shank to better seat the barbs in the material.

---

The invention relates to a hook device for use primarily with artificial bait that is made of soft, resilient plastic material.

Among the more popular artificial baits used by fishing enthusiasts are those made from soft resilient plastic materials. In practice, such bait are impaled on the hook in the manner of live baits. Unlike the live baits, however, the artificial baits lack internal bone structure which resist tearing of the flesh of the live bait, and consequently it frequently happens that the artificial bait is torn from the hook when the bait is struck by a fish or encounters an underwater obstruction such as underwater vegetative matter.

Various forms of fish-hooking devices have been previously advocated for the purpose of better securing the live baits to the hook and in most instances the proposals have been centered around the use of auxiliary barbs and locking devices. Locking devices are generally unacceptable because they expose structure to the intended victim which detracts from the lure aspects of the bait. The auxiliary barbs advocated are also unacceptable when it comes to their being used with plastic baits because in most instances they are so constructed as to unduly tear the plastic material as the artificial bait is impaled on the hook. In addition, most of the prior-art barb arrangements fail to properly seat in the plastic material so as to suitably aid in preventing withdrawal of the bait from the hook. In other advocated instances, the provision of auxiliary barbs to overcome the problem would be so costly from a manufacturing standpoint as to make the consumer price for such hooking devices prohibitive to the consumer.

A general object of the invention is to provide an improved fish hook device for use with artificial bait made from soft resilient plastic material.

A further object is to provide an inexpensive hooking device for artificial baits of the soft plastic type and which has improved ability to retain the bait on the hook.

Still a further object is to provide a fish hook device for artificial baits of the soft plastic type in which not only has improved bait retention characteristics but which also is easy for sportmen to use in practice.

In accord with the invention, an arrowhead-shaped metal element is cast upon the shank of the fish hook and whereat is serves to provide a pair of auxiliary barbs which, by a minor amount of pressure to overcome the adherence of the cast element to the shank, can be rotatably adjusted on the shank after the plastic bait is impaled on the hook to better secure the bait to the fish hook. By virtue of the shape of the element, a pair of cutting edges are provided on the element and which provides a narrow slit in the bait material as the bait is impaled on the hook. Thereafter, by rotation of the element on the shank of the hook, the barbs are capable of becoming bettter seated in the plastic material to prevent detachment of the bait from the hook.

The novel features which are believed to be characteristic of this invention are set forth with particularity in the appended claim. The invention itself, however, both as to its organization and method of operation, together with further objects and advantages thereof, may best be understood by reference to the following description taken in connection with the accompanying drawings in which:

FIG. 1 is an enlarged perspective view of an improved fish hook embodying the concepts of the invention.

FIG. 2 is an enlarged longitudinal sectional view through the arrowhead-shaped auxiliary barb arrangement provided in the fish hook shown in FIG. 1 and as generally seen along the lines 2—2 therein.

FIG. 3 is a longitudinal side elevational view of the fish hook shown in FIG. 1 as seen during an intermediate stage in the attachment of an artificial bait of the "worm" type to the hook, with some parts broken away and shown in section.

FIG. 4 is a view similar to that shown in FIG. 3 but shows the fish hook at a final stage of adjustment in the process of securing the artificial bait on the hook, some parts being again broken away and shown in section.

FIG. 5 is an enlarged transverse section view taken generally along the lines 5—5 of FIG. 3.

FIG. 6 is an enlarged transverse section view taken generally along the lines 6—6 of FIG. 4.

Reference is now made to FIGS. 1 and 2 and wherein the improved fish hook is generally designated at 10. It includes an elongated metal element 11 which is shown in the form of a conventional fish hook and also includes an arrowhead-shaped metal element 12 which is cast upon the shank portion of the rigid element 11 in the manufacture of the hook 10. As illustrated, fish hook 10 is also equipped with a conventional well-known type of weed deflector 14 and which forms no part of the invention.

Element 11 is bent at one end to provide an eyelet portion 15 to which a fish line or line leader may be attached in the usual manner. At the other end of the element, the element 11 is provided with a return bend or hook portion 16, and the main barb 17 of the hook 10 is provided in the element at the extremity of the hook portion 16 as seen in the drawings. The elongated shank 13 extends between the eyelet 15 and hook 16 portions, and it is deemed evident that the eyelet 15, shank 13 and hook 16 portions of the element 11 are integrally joined in rigid element 11.

Element 12 as seen in FIGS. 1 and 2, is cast on the shank 13 in the form of an arrowhead and in a manner such that the shank 13 of the hook element 11 extends between the opposite ends 23 and 24 of the element 12 and axially through an elongated cylindrical opening 18 which is formed in the element 12 during solidification of the cast metal.

The material used in casting the element is preferably lead or a suitable lead alloy which provides a bond with the metal shank 13 during solidification that is thereafter easily broken so as to enable the element to be rotatably adjusted on the shank 13 to an adjusted position, such as designated at 34.

The arrowhead shape of element 12 is such as to provide a pair of barbs 19 and 20 which, as cast on the shank, are located at the opposite sides of the shank and which are designated at 21 and 22, respectively. As best seen in FIG. 1, the barbs 19 and 20 are symmetrically arranged in the structure of the element 12 and in a manner such as to open toward the eyelet portion of the element 11 at the adjacent end 23 of the cast element 12 in the assembled hook 10.

Barbs 19 and 20 generally taper from the trailing end 23 to the other end 24 of element 12. As seen transversely, the barbs 19 and 20 are generally triangular in shape and are integrally joined at their bases along laterally-extending lips 25 that are formed at the juncture of the molds, not shown, in the metal casting process used in forming the element 12. This arrangement provides elongated generally-straight side edges, designated at 26 and 27, for the respective barbs 19 and 20. These edges, as seen in FIGS. 1 and 2, are inclined to the longitudinal axis 30 of the shank 13 and converge from the opposite sides of the shank toward the axis at the leading end 24 of the arrow-shaped element.

As previously indicated, the weed deflector 14 is of conventional design, and as seen in FIG. 1, consists of a resilient metal wire 28 which is bent intermediate its ends 29 to provide a center loop. The end portions 29 of the wire extend through the eyelet 15 in the hook shown in the drawings and are soldered to the underside of the shank 13 by a suitable soldering material designated at 32. The arrangement is such that the loop 31 is capable of being bent into engagement with the barb 17 as seen in FIG. 1 to thereat carry out its intended weed-deflecting function during use and has a normal position when disengaged from the barb 17 which is designated at 33.

The manner in which the improved fish hook 10 is employed in practice is illustrated in FIGS. 3 through 6 and wherein the hook 10 is shown attached to a leader 35 of a fish line and wherein the artificial bait 36 is shown in the form of an elongated worm which has been molded from suitable soft resilient plastic material by techniques which are well known in the art.

In attaching the bait 36 to the hook 10, the weed deflector 14 is first released from the barb 17 as seen in FIG. 3. Thereafter the bait 36 is threaded onto the element 11 from the main barb 17 end of the element, and the hook portion 16 is permitted to pass to the exterior of the bait 36 as seen in FIG. 3. As the bait is threaded on the element 11, the arrow-shaped cast element 12 passes into the body 37 of the plastic bait item and the edges 26 and 27 of the auxiliary barbs 19 and 20 respectively cut a narrow slit 38 in the body 37 and accomplish this without extensive tearing of the plastic material as happens with many prior-art types of auxiliary barb arrangements. Once the bait 36 has been impaled on the element and the slit has been cut in the body of the plastic material, the arrow-shaped element 12 is then rotated about 90° by finger manipulation on the shank 13 as indicated by arrows 39. This rotational adjustment of the cast element 12 moves the barbs 19 and 20 transversely of the general plane of the slit 38 as indicated in FIGS. 5 and 6 and permits the tips 40 of the barbs to become seated in plastic material which is generally offset from the slit in the body of the bait 36. Once this has been accomplished, the weed-deflecting element may be attached to barb 17 as shown in FIG. 4.

With the cast element arranged transversely of the slit, a greater force is required to withdraw or tear the bait from the hook.

The bond between the cast element 12 and the shank 13 can be broken either prior to impaling the bait on the hook or afterwards. Once broken, however, it will be found that the shank 13 remains in frictional contact with the cast element 12 because of the soft nature of the metal used in the casting process, and furthermore, because of the close fit which is attained between the elements 11 and 12 by virtue of the casting procedure. Consequently, when the arrowhead-shaped element is rotatably adjusted, it remains in its adjusted position during the normal course of using the baited arrangement.

From the foregoing description it is evident that it is easy for the sportsmen to bait the hook and that a minimum amount of tearing occurs as the bait is being placed upon the hook. Yet another advantage to the arrangement is the fact that the use of lead or lead alloy in casting the arrowhead-shaped element provides weight on the hook end of the line internally of the bait per se and thus avoids the need for auxiliary weights on the line which frequently counteract the luring aspects of the bait to the intended victim.

While only certain preferred embodiments of this invention have been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by Letters Patent of the United States is:

1. A fishhook for use with artificial bait composed of resilient plastic material comprising an elongated element having an eyelet portion, a barbed hook portion, and an elongated shank portion extending between and integral with the eyelet and barbed hook portions of the elongated element, and a cast metal element supported by said shank portion and having opposite ends, and an elongated opening extending between said opposite ends; said shank portion extending through said opening and being in frictional contact with the metal element in said opening, said element being adapted and arranged to provide a pair of barbs which are respectively located at opposite sides of said shank portion and which open toward said eyelet portion of the elongated element at one of said opposite ends, and each of said barbs having an elongated side edge which is inclined to the longitudinal axis of the shank portion and converges toward said axis at the other of said opposite ends, and said metal element being rotatably adjustable on said shank portion.

References Cited
UNITED STATES PATENTS

| | | | |
|---|---|---|---|
| 662,139 | 11/1900 | Warren | 43—42.24 |
| 1,152,698 | 9/1915 | Bonner | 43—44.8 |
| 1,992,969 | 3/1935 | Soukup | 43—44.8 |
| 2,148,074 | 2/1939 | Kaspick | 43—44.8 |
| 2,564,216 | 8/1951 | Stark | 43—44.8 |

SAMUEL KOREN, Primary Examiner

DANIEL J. LEACH, Assistant Examiner

U.S. Cl. X.R.

43—42.24, 42.37, 43.6, 44.81